US006889737B2

(12) United States Patent
Weydert et al.

(10) Patent No.: US 6,889,737 B2
(45) Date of Patent: May 10, 2005

(54) PNEUMATIC TIRE HAVING A COMPONENT CONTAINING HIGH TRANS STYRENE-BUTADIENE RUBBER

(75) Inventors: Marc Weydert, Luxembourg (LU); Georges Marcel Victor Thielen, Schouweiler (LU); Adel Farhan Halasa, Bath, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 152 days.

(21) Appl. No.: 10/313,779

(22) Filed: Dec. 5, 2002

(65) Prior Publication Data

US 2004/0108034 A1 Jun. 10, 2004

(51) Int. Cl.$^7$ .............................. C08L 31/04; B60C 1/00
(52) U.S. Cl. ..................... 152/525; 524/526; 525/241
(58) Field of Search ................. 524/526; 525/241; 152/525

(56) References Cited

U.S. PATENT DOCUMENTS

| | | | |
|---|---|---|---|
| 3,992,561 A | 11/1976 | Hargis et al. | 526/181 |
| 4,020,115 A | 4/1977 | Hargis et al. | 260/632 |
| 4,033,900 A | 7/1977 | Hargis et al. | 252/431 |
| 4,048,427 A | 9/1977 | Hargis et al. | 526/337 |
| 4,260,519 A | 4/1981 | Aggarwal et al. | 252/431 |
| 4,260,712 A | 4/1981 | Aggarwal et al. | 526/181 |
| 4,297,240 A | 10/1981 | Bingham et al. | 252/431 |
| 4,302,568 A | 11/1981 | Bingham et al. | 526/187 |
| 4,307,218 A | 12/1981 | Bingham et al. | 526/340 |
| 4,355,156 A | 10/1982 | Bingham et al. | 528/413 |
| 4,503,204 A | 3/1985 | Bingham et al. | 526/187 |
| 4,616,065 A | 10/1986 | Hargis et al. | 525/99 |
| 4,669,518 A | 6/1987 | Hargis et al. | 152/209 |
| 4,670,502 A | 6/1987 | Hargis et al. | 524/505 |
| 5,100,965 A | 3/1992 | Hsu et al. | 525/249 |
| 5,216,080 A | 6/1993 | Suzuki et al. | 525/153 |
| 5,627,237 A | 5/1997 | Halasa et al. | 525/236 |
| 5,753,579 A | 5/1998 | Jalics et al. | 502/153 |
| 5,834,573 A | 11/1998 | Castner | 526/142 |
| 5,902,856 A | 5/1999 | Suzuki et al. | 525/237 |
| 6,013,737 A | 1/2000 | Takagishi et al. | 525/332.7 |
| 6,015,850 A | 1/2000 | Nakamura et al. | 524/188 |
| 6,046,266 A | 4/2000 | Sandstrom et al. | 524/492 |
| 6,057,397 A | 5/2000 | Takagishi et al. | 524/492 |
| 6,103,842 A | 8/2000 | Halasa et al. | 526/175 |
| 6,111,045 A | 8/2000 | Takagishi et al. | 526/338 |
| 6,114,432 A | 9/2000 | Takagishi et al. | 524/494 |
| 6,147,178 A | 11/2000 | Nakamura et al. | 526/340 |
| 6,211,321 B1 | 4/2001 | Takagishi et al. | 526/335 |
| 6,310,152 B1 | 10/2001 | Castner | 526/142 |
| 6,333,375 B1 | 12/2001 | Nakamura et al. | 524/394 |

FOREIGN PATENT DOCUMENTS

| | | | |
|---|---|---|---|
| EP | 0 589 239 A1 | 3/1994 | C08L/9/06 |
| EP | 0 990 670 A1 | 4/2000 | C08F/236/10 |
| EP | 1 148 083 A1 | 10/2001 | C08L/9/00 |
| EP | 1 285 932 A2 | 2/2003 | C08F/36/00 |

*Primary Examiner*—Peter D. Mulcahy
(74) *Attorney, Agent, or Firm*—John D. DeLong

(57) ABSTRACT

The invention is directed to a pneumatic tire having at least one component comprising a vulcanizable rubber composition, wherein the vulcanizable rubber composition comprises, based on 100 parts by weight of elastomer (phr), from about 5 to 30 phr of high trans random SBR, and from about 70 to about 95 phr of at least one additional elastomer, wherein the high trans random SBR comprises from about 3 to about 30 percent by weight of styrene.

18 Claims, No Drawings

PNEUMATIC TIRE HAVING A COMPONENT CONTAINING HIGH TRANS STYRENE-BUTADIENE RUBBER

BACKGROUND OF THE INVENTION

It is highly desirable for tires to have good wet skid resistance, low rolling resistance, and good wear characteristics. It has traditionally been very difficult to improve a tire's wear characteristics without sacrificing its wet skid resistance and traction characteristics. These properties depend, to a great extent, on the dynamic viscoelastic properties of the rubbers utilized in making the tire.

In order to reduce the rolling resistance and to improve the treadwear characteristics of tires, rubbers having a high rebound have traditionally been utilized in making tire tread rubber compounds. On the other hand, in order to increase the wet skid resistance of a tire, rubbers which undergo a large energy loss have generally been utilized in the tire's tread. In order to balance these two viscoelastically inconsistent properties, mixtures of various types of synthetic and natural rubber are normally utilized in tire treads. For instance, various mixtures of styrene-butadiene rubber and polybutadiene rubber are commonly used as a rubbery material for automobile tire treads.

U.S. Pat. No. 6,103,842 and U.S. application Ser. No. 10/124,006, now U.S. Pat. No. 6,627,715, disclose processes and catalyst systems for the copolymerization of 1,3-butadiene monomer and styrene monomer into a styrene-butadiene copolymer having a high trans-1,4-polybutadiene content and having a random distribution of repeat units which are derived from styrene. It is also therein disclosed that styrene-butadiene rubber made utilizing the catalyst system and techniques therein may be used in the preparation of tire tread rubber compounds which exhibit improved wear characteristics. What is not disclosed is that superior wear characteristics may be obtained using a low styrene content in the high trans random SBR.

SUMMARY OF THE INVENTION

The current invention is directed to a pneumatic tire having at least one component comprising a high trans solution styrene-butadiene rubber (HTSBR) with a random distribution of repeat units which are derived from styrene. The invention is based on the highly surprising and unexpected discovery that a desirable balance of properties may be realized by using a HTSBR with a low styrene content.

It is then an object of the present invention to provide a pneumatic tire having at least one component comprising a vulcanizable rubber composition, wherein the vulcanizable rubber composition comprises, based on 100 parts by weight of elastomer (phr), from about 5 to 30 phr of high trans random SBR, and from about 70 to about 95 phr of at least one additional elastomer, wherein the high trans random SBR comprises from about 3 to about 30 percent by weight of styrene.

DESCRIPTION OF THE INVENTION

The pneumatic tire of the present invention has at least one component comprising a high trans solution styrene-butadiene rubber HTSBR. By HTSBR, it is meant an SBR produced by a solution method and having a percentage of trans-1,4-butadiene conformation in the polybutadiene segments of the polymer of greater than 60 percent by weight. Alternatively, suitable HTSBR may have a percentage of trans-1,4-butadiene conformation in the polybutadiene segments of the polymer of greater than 70 percent by weight. Suitable HTSBR may contain from about 3 to about 30 percent by weight of styrene. Alternatively, suitable HTSBR may contain from about 3 to about 20 percent by weight of styrene. Alternatively, suitable HTSBR may contain from about 3 to about 10 percent by weight of styrene.

Suitable HTSBR may be made by any of the suitable solution polymerization methods as are known in the art. In one embodiment, suitable HTSBR may be made using the methods of U.S. Pat. No. 6,103,842. In another embodiment, suitable HTSBR may be made using the methods of U.S. application Ser. No. 10/124,006, now U.S. Pat. No. 6,627,715. Styrene-butadiene rubbers so made may contain from about 2 weight percent to about 50 weight percent styrene and from about 50 weight percent to about 98 weight percent 1,3-butadiene. However, in some cases, the amount of styrene included will be as low as about 1 weight percent. In one embodiment of the present invention, suitable styrene-butadiene rubber so made will contain from about 3 weight percent to about 30 weight percent styrene and from about 70 weight percent to about 97 weight percent 1,3-butadiene. In another embodiment, suitable styrene-butadiene rubber will contain from about 3 weight percent to about 20 weight percent styrene and from about 80 weight percent to about 97 weight percent 1,3-butadiene. In another embodiment, suitable styrene-butadiene rubber will contain from about 3 weight percent to about 10 weight percent styrene and from about 90 weight percent to about 97 weight percent 1,3-butadiene. These styrene-butadiene rubbers typically have a melting point which is within the range of about below 44° C. Higher styrene content HTSBR may exhibit no melting point.

The styrene-butadiene rubber will typically have a glass transition temperature in a range of from about −55° C. to about −85° C.; alternatively from about −65° C. to about −85° C.

In suitable styrene-butadiene rubbers containing less than about 30 weight percent bound styrene, the distribution of repeat units derived from styrene and butadiene is essentially random. The term "random" as used herein means that less than 10 percent of the total quantity of repeat units derived from styrene are in blocks containing more than five styrene repeat units. In other words, more than 90 percent of the repeat units derived from styrene are in blocks containing five or fewer repeat units. About 20% of the repeat units derived from styrene will be in blocks containing only one styrene repeat unit. Such blocks containing one styrene repeat unit are bound on both sides by repeat units which are derived from 1,3-butadiene.

In suitable styrene-butadiene rubbers containing less than about 20 weight percent bound styrene, less than 4 percent of the total quantity of repeat units derived from styrene are in blocks containing five or more styrene repeat units. In other words, more than 96 percent of the repeat units derived from styrene are in blocks containing less than five repeat units. In such styrene-butadiene rubbers, over 25 percent of repeat units derived from styrene will be in blocks containing only one styrene repeat unit, over 60 percent of the repeat units derived from styrene will be in blocks containing less than 3 repeat units, and over 90 percent of the repeat units derived from styrene will be in blocks containing 4 or fewer repeat units.

In suitable styrene-butadiene rubbers containing less than about 10 weight percent bound styrene, less than 1 percent of the total quantity of repeat units derived from styrene are in blocks containing 5 or more styrene repeat units. In other words, more than 99 percent of the repeat units derived from styrene are in blocks containing 4 or less repeat units. In such styrene-butadiene rubbers, at least about 50 percent of repeat units derived from styrene will be in blocks containing only one styrene repeat unit and over about 85 percent of the repeat units derived from styrene will be in blocks containing less than 3 repeat units.

Suitable styrene-butadiene copolymers also have a consistent composition throughout their polymer chains. In other words, the styrene content of the polymer will be the same from the beginning to the end of the polymer chain. No segments of at least 100 repeat units within the polymer will have a styrene content which differs from the total styrene content of the polymer by more than 10 percent. Such styrene-butadiene copolymers will typically contain no segments having a length of at least 100 repeat units which have a styrene content which differs from the total styrene content of the polymer by more than about 5 percent.

In the broadest embodiment, suitable HTSBR may be made by any of the suitable solution polymerization methods as are known in the art. In one embodiment, suitable HTSBR may be produced using a process as taught in U.S. application Ser. No. 10/124,006, now U.S. Pat. No. 6,627,715, fully incorporated herein by reference, that comprises copolymerizing styrene and 1,3-butadiene in an organic solvent in the presence of a catalyst system that is comprised of (A) an organolithium compound, (B) a group ha metal salt selected from the group consisting of group IIa metal salts of amino glycols and group ha metal salts of glycol ethers, and (C) an organometallic compound selected from the group consisting of organoaluminum compounds and organomagnesium compounds.

In another embodiment, suitable HTSBR may be produced using a process as taught in U.S. Pat. No. 6,103,842, fully incorporated herein by reference, that comprises copolymerizing styrene and 1,3-butadiene under isothermal conditions in an organic solvent in the presence of a catalyst system which consists essentially of (A) an organolithium compound;

(B) a barium alkoxide; and (C) a lithium alkoxide.

In one embodiment, the pneumatic tire of the present invention may include a component comprising between about 5 and about 30 parts by weight of HTSBR. The component may also include between 70 and up to 95 parts by weight of other elastomers as are known in the art, to make up a total 100 parts by weight of elastomer. In another embodiment, the pneumatic tire of the present invention may include a component comprising between about 10 and about 20 parts by weight of HTSBR. The component may also include between about 80 and about 90 parts by weight of other elastomers as are known in the art, to make up a total 100 parts by weight of elastomer.

Other elastomers that may be used along with the HTSBR may include various general purpose elastomers as are known in the art. The phrase "rubber or elastomer containing olefinic unsaturation" is intended to include both natural rubber and its various raw and reclaim forms as well as various synthetic rubbers. In the description of this invention, the terms "rubber" and "elastomer" may be used interchangeably, unless otherwise prescribed. The terms "rubber composition", "compounded rubber" and "rubber compound" are used interchangeably to refer to rubber which has been blended or mixed with various ingredients and materials, and such terms are well known to those having skill in the rubber mixing or rubber compounding art. Representative synthetic polymers are the homopolymerization products of butadiene and its homologues and derivatives, for example, methylbutadiene, dimethylbutadiene and pentadiene as well as copolymers such as those formed from butadiene or its homologues or derivatives with other unsaturated monomers. Among the latter are acetylenes, for example, vinyl acetylene; olefins, for example, isobutylene, which copolymerizes with isoprene to form butyl rubber; vinyl compounds, for example, acrylic acid, acrylonitrile (which polymerize with butadiene to form NBR), methacrylic acid and styrene, the latter compound polymerizing with butadiene to form SBR, as well as vinyl esters and various unsaturated aldehydes, ketones and ethers, e.g., acrolein, methyl isopropenyl ketone and vinylethyl ether. Specific examples of synthetic rubbers include neoprene (polychloroprene), polybutadiene (including cis-1,4-polybutadiene), polyisoprene (including cis-1,4-polyisoprene), butyl rubber, halobutyl rubber such as chlorobutyl rubber or bromobutyl rubber, styrene/isoprene/butadiene rubber, copolymers of 1,3-butadiene or isoprene with monomers such as styrene, acrylonitrile and methyl methacrylate, as well as ethylene/propylene terpolymers, also known as ethylene/propylene/diene monomer (EPDM), and in particular, ethylene/propylene/dicyclopentadiene terpolymers. Additional examples of rubbers which may be used include a carboxylated rubber, silicon-coupled and tin-coupled star-branched polymers. The preferred rubber or elastomers are polybutadiene, SBR, and natural rubber.

In one aspect, the rubber to be combined with the HTSBR is preferably one or more diene-based rubbers. For example, one or more rubbers is preferred such as cis 1,4-polyisoprene rubber (natural or synthetic, although natural is preferred), 3,4-polyisoprene rubber, emulsion and solution polymerization derived styrene/isoprene/butadiene rubber, emulsion and solution polymerization derived styrene/butadiene rubbers, emulsion and solution polymerization derived isoprene/butadiene rubber, emulsion and solution polymerization derived styrene/isoprene rubber, cis 1,4-polybutadiene rubbers and emulsion polymerization prepared butadiene/acrylonitrile copolymers.

In one alternative embodiment, the rubber to be combined with the HTSBR is solution polymerized styrene/butadiene rubber. In one embodiment, from about 70 to about 95 phr of SSBR may be combined with the HTSBR.

In one alternative embodiment, the rubber to be combined with the HTSBR is solution polymerized styrene/butadiene rubber and cis 1,4-polybutadiene rubber.

In another embodiment, the rubber to be combined with the HTSBR is, per 100 parts by weight of additional elastomer, from about 65 to about 90 parts by weight of solution polymerized styrene/butadiene rubber, and from about 35 to about 10 parts by weight of cis 1,4-polybutadiene rubber.

In another embodiment, the combination of HTSBR with the additional elastomer is done such that the glass transition temperature Tg of the resulting combination of elastomers is within an acceptable range for use in a tire tread. Such a Tg may be obtained by utilizing a combination of additional elastomers to have Tg in a range of from about −10° C. to about −50° C.

The vulcanizable rubber composition may include from about 50 to about 100 phr of silica.

The commonly employed siliceous pigments which may be used in the rubber compound include conventional pyrogenic and precipitated siliceous pigments (silica), although precipitated silicas are preferred. The conventional siliceous pigments preferably employed in this invention are precipitated silicas such as, for example, those obtained by the acidification of a soluble silicate, e.g., sodium silicate.

Such conventional silicas might be characterized, for example, by having a BET surface area, as measured using nitrogen gas, preferably in the range of about 40 to about 600, and more usually in a range of about 50 to about 300 square meters per gram. The BET method of measuring surface area is described in the *Journal of the American Chemical Society*, Volume 60, Page 304 (1930).

The conventional silica may also be typically characterized by having a dibutylphthalate (DBP) absorption value in a range of about 100 to about 400, and more usually about 150 to about 300.

The conventional silica might be expected to have an average ultimate particle size, for example, in the range of 0.01 to 0.05 micron as determined by the electron microscope, although the silica particles may be even smaller, or possibly larger, in size.

Various commercially available silicas may be used, such as, only for example herein, and without limitation, silicas commercially available from PPG Industries under the Hi-Sil trademark with designations 210, 243, etc; silicas available from Rhodia, with, for example, designations of Z1165MP and Z165GR and silicas available from Degussa AG with, for example, designations VN2 and VN3, etc.

The vulcanizable rubber composition may include from about 40 to about 80 phr of carbon black Commonly employed carbon blacks can be used as a conventional filler. Representative examples of such carbon blacks include N110, N121, N220, N231, N234, N242, N293, N299, S315, N326, N330, M332, N339, N343, N347, N351, N358, N375, N539, N550, N582, N630, N642, N650, N683, N754, N762, N765, N774, N787, N907, N908, N990 and N991. These carbon blacks have iodine absorptions ranging from 9 to 145 g/kg and DBP number ranging from 34 to 150 cm³/100 g.

The vulcanizable rubber composition may include both silica and carbon black in a combined concentration of from about 20 to about 100 phr, in any weight ratio of silica to carbon black.

Other fillers may be used in the rubber composition, including but not limited to particulate fillers including ultra high molecular weight polyethylene (UHMWPE), particulate polymer gels such as those disclosed in U.S. Pat. Nos. 6,242,534; 6,207,757; 6,133,364; 6,372,857; 5,395,891; or 6,127,488, and plasticized starch composite filler such as that disclosed in U.S. Pat. No. 5,672,639.

It may be preferred to have the rubber composition for use in the tire component to additionally contain a conventional sulfur containing organosilicon compound. Examples of suitable sulfur containing organosilicon compounds are of the formula:

Z-Alk-S$_n$-Alk-Z in which Z is selected from the group consisting of

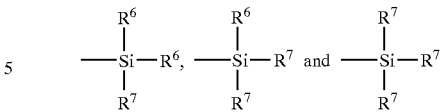

where $R^6$ is an alkyl group of 1 to 4 carbon atoms, cyclohexyl or phenyl; $R^7$ is alkoxy of 1 to 8 carbon atoms, or cycloalkoxy of 5 to 8 carbon atoms; Alk is a divalent hydrocarbon of 1 to 18 carbon atoms and n is an integer of 2 to 8.

Specific examples of sulfur containing organosilicon compounds which may be used in accordance with the present invention include: 3,3'-bis(trimethoxysilylpropyl)disulfide, 3,3'-bis(triethoxysilyipropyl)disulfide, 3,3'-bis(triethoxysilylpropyl)tetrasulfide, 3,3'-bis(triethoxysilylpropyl)octasulfide, 3,3'-bis(trimethoxysilylpropyl)tetrasulfide, 2,2'-bis(triethoxysilylethyl)tetrasulfide, 3,3'-bis(trimethoxysilylpropyl)trisulfide, 3,3'-bis(triethoxysilylpropyl)trisulfide, 3,3'-bis(tributoxysilylpropyl)disulfide, 3,3'-bis(trimethoxysilyipropyl)hexasulfide, 3,3'-bis(trimethoxysilylpropyl)octasulfide, 3,3'-bis(trioctoxysilylpropyl)tetrasulfide, 3,3'-bis(trihexoxysilylpropyl)disulfide, 3,3'-bis(tri-2"-ethylhexoxysilylpropyl)trisulfide, 3,3'-bis(triisooctoxysilylpropyl)tetrasulfide, 3,3'-bis(tri-t-butoxysilylpropyl)disulfide, 2,2'-bis(methoxy diethoxy silyl ethyl)tetrasulfide, 2,2'-bis(tripropoxysilylethyl)pentasulfide, 3,3'-bis(tricyclonexoxysilylpropyl)tetrasulfide, 3,3'-bis(tricyclopentoxysilylpropyl)trisulfide, 2,2'-bis(tri-2"-methylcyclohexoxysilylethyl)tetrasulfide, bis(trimethoxysilylmethyl)tetrasulfide, 3-methoxy ethoxy propoxysilyl 3'-diethoxybutoxy-silylpropyltetrasulfide, 2,2'-bis(dimethyl methoxysilylethyl)disulfide, 2,2'-bis(dimethyl sec.butoxysilylethyl)trisulfide, 3,3'-bis(methyl butylethoxysilylpropyl)tetrasulfide, 3,3'-bis(di t-butylmethoxysilylpropyl)tetrasulfide, 2,2'-bis(phenyl methyl methoxysilylethyl)trisulfide, 3,3'-bis(diphenyl isopropoxysilylpropyl)tetrasulfide, 3,3'-bis(diphenyl cyclohexoxysilylpropyl)disulfide, 3,3'-bis(dimethyl ethylmercaptosilylpropyl)tetrasulfide, 2,2'-bis(methyl dimethoxysilylethyl)trisulfide, 2,2'-bis(methyl ethoxypropoxysilylethyl)tetrasulfide, 3,3'-bis(diethyl methoxysilylpropyl)tetrasulfide, 3,3'-bis(ethyl di-sec.butoxysilylpropyl)disulfide, 3,3'-bis(propyl diethoxysilylpropyl)disulfide, 3,3'-bis(butyl dimethoxysilylpropyl)trisulfide, 3,3'-bis(phenyl dimethoxysilyipropyl)tetrasulfide, 3-phenyl ethoxybutoxysilyl 3'-trimethoxysilylpropyl tetrasulfide, 4,4'-bis(trimethoxysilylbutyl)tetrasulfide, 6,6'-bis(triethoxysilylhexyl)tetrasulfide, 12,12'-bis(triisopropoxysilyl dodecyl)disulfide, 18,18'-bis(trimethoxysilyloctadecyl)tetrasulfide, 18,18'-bis(tripropoxysilyloctadecenyl)tetrasulfide, 4,4'-bis(trimethoxysilyl-buten-2-yl)tetrasulfide, 4,4'-bis(trimethoxysilylcyclohexylene)tetrasulfide, 5,5'-bis(dimethoxymethylsilylpentyl)trisulfide, 3,3'-bis(trimethoxysilyl-2-methylpropyl)tetrasulfide, 3,3'-bis(dimethoxyphenylsilyl-2-methylpropyl)disulfide.

The preferred sulfur containing organosilicon compounds are the 3,3'-bis(trimethoxy or triethoxy silylpropyl)sulfides. The most preferred compounds are 3,3'-bis(triethoxysilylpropyl)disulfide and 3,3'-bis (triethoxysilylpropyl)tetrasulfide. Therefore as to formula I, preferably Z is

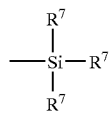

where $R^7$ is an alkoxy of 2 to 4 carbon atoms, with 2 carbon atoms being particularly preferred; alk is a divalent hydrocarbon of 2 to 4 carbon atoms with 3 carbon atoms being particularly preferred; and n is an integer of from 2 to 5 with 2 and 4 being particularly preferred.

The amount of the sulfur containing organosilicon compound of formula I in a rubber composition will vary depending on the level of other additives that are used. Generally speaking, the amount of the compound of formula I will range from 0.5 to 20 phr. Preferably, the amount will range from 1 to 10 phr.

It is readily understood by those having skill in the art that the rubber composition would be compounded by methods generally known in the rubber compounding art, such as mixing the various sulfur-vulcanizable constituent rubbers with various commonly used additive materials such as, for example, sulfur donors, curing aids, such as activators and retarders and processing additives, such as oils, resins including tackifying resins and plasticizers, fillers, pigments, fatty acid, zinc oxide, waxes, antioxidants and antiozonants and peptizing agents. As known to those skilled in the art, depending on the intended use of the sulfur vulcanizable and sulfur-vulcanized material (rubbers), the additives mentioned above are selected and commonly used in conventional amounts. Representative examples of sulfur donors include elemental sulfur (free sulfur), an amine disulfide, polymeric polysulfide and sulfur olefin adducts. Preferably, the sulfur-vulcanizing agent is elemental sulfur. The sulfur-vulcanizing agent may be used in an amount ranging from 0.5 to 8 phr, with a range of from 1.5 to 6 phr being preferred. Typical amounts of tackifier resins, if used, comprise about 0.5 to about 10 phr, usually about 1 to about 5 phr. Typical amounts of processing aids comprise about 1 to about 50 phr. Such processing aids can include, for example, aromatic, naphthenic, and/or paraffinic processing oils. Typical amounts of antioxidants comprise about 1 to about 5 phr. Representative antioxidants may be, for example, diphenyl-p-phenylenediamine and others, such as, for example, those disclosed in the *Vanderbilt Rubber Handbook* (1978), Pages 344 through 346. Typical amounts of antiozonants comprise about 1 to 5 phr. Typical amounts of fatty acids, if used, which can include stearic acid comprise about 0.5 to about 3 phr. Typical amounts of zinc oxide comprise about 2 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

Accelerators are used to control the time and/or temperature required for vulcanization and to improve the properties of the vulcanizate. In one embodiment, a single accelerator system may be used, i.e., primary accelerator. The primary accelerator(s) may be used in total amounts ranging from about 0.5 to about 4, preferably about 0.8 to about 1.5, phr. In another embodiment, combinations of a primary and a secondary accelerator might be used with the secondary accelerator being used in smaller amounts, such as from about 0.05 to about 3 phr, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound.

The mixing of the rubber composition can be accomplished by methods known to those having skill in the rubber mixing art. For example the ingredients are typically mixed in at least two stages, namely, at least one non-productive stage followed by a productive mix stage. The final curatives including sulfur-vulcanizing agents are typically mixed in the final stage which is conventionally called the "productive" mix stage in which the mixing typically occurs at a temperature, or ultimate temperature, lower than the mix temperature(s) than the preceding non-productive mix stage(s). The terms "non-productive" and "productive" mix stages are well known to those having skill in the rubber mixing art. The rubber composition may be subjected to a thermomechanical mixing step. The thermomechanical mixing step generally comprises a mechanical working in a mixer or extruder for a period of time suitable in order to produce a rubber temperature between 140° C. and 190° C. The appropriate duration of the thermomechanical working varies as a function of the operating conditions, and the volume and nature of the components. For example, the thermomechanical working may be from 1 to 20 minutes.

The rubber composition may be incorporated in a variety of rubber components of the tire. For example, the rubber component may be a tread (including tread cap and tread base), sidewall, apex, chafer, sidewall insert, wirecoat or innerliner. Preferably, the compound is a tread.

The pneumatic tire of the present invention may be a race tire, passenger tire, aircraft tire, agricultural, earthmover, off-the-road, truck tire and the like. Preferably, the tire is a passenger or truck tire. The tire may also be a radial or bias, with a radial being preferred.

Vulcanization of the pneumatic tire of the present invention is generally carried out at conventional temperatures ranging from about 100° C. to 200° C. Preferably, the vulcanization is conducted at temperatures ranging from about 110° C. to 180° C. Any of the usual vulcanization processes may be used such as heating in a press or mold, heating with superheated steam or hot air. Such tires can be built, shaped, molded and cured by various methods which are known and will be readily apparent to those having skill in such art.

The following examples are presented for the purposes of illustrating and not limiting the present invention. All parts are parts by weight unless specifically identified otherwise.

EXAMPLE I

In this example, a high trans random solution SBR (HTSBR) polymer prepared following the teachings of U.S. application Ser. No. 10/124,006, now U.S. Pat. No. 6,627,715, and containing about 8 percent by weight of styrene was compounded and tested for various physical properties.

The polymer was compounded with standard amounts of conventional curatives and processing aids as indicated in Table 1, and cured with a standard cure cycle. Cured samples were evaluated for various physical properties following standard tests protocols as indicated in Table 2.

TABLE 1

Compound Recipe

| Elastomers | 100 |
|---|---|
| Zinc Oxide | 2.5 |
| Process Oil | 26.5 |
| Stearic Acid | 3 |
| Wax | 1.5 |
| Silica | 75 |
| Sulfur | 1.7 |
| Antidegradants[1] | 3 |
| Accelerators[2] | 3.6 |
| Coupling Agent[3] | 12 |

[1] p-phenylenediamine type
[2] sulfenamide type
[3] 50 percent by weight on carbon black carrier

TABLE 2

| | Sample | |
|---|---|---|
| | 1 | 2 |
| Elastomers | | |
| | 70 phr JSR T596 SSBR | 68 phr JSR T596 SSBR |
| | 30 phr Budene 1207 polybutadiene | 20 phr Budene 1207 polybutadiene |
| | | 12 phr HTSBR |
| Tear Strength, N | 14.5 | 17.3 |
| Elongation, % | 387.7 | 430.1 |
| True Tensile, MPa | 87.5 | 97.1 |
| RPA Tan Delta 10% | 0.083 | 0.095 |
| Rebound 100° C., % | 68.4 | 65.6 |
| Rebound 0° C., % | 8.8 | 8.4 |
| Drum Abrasion (mm$^3$) | 89.7 | 98.5 |
| Shore A | 63.4 | 62.3 |
| Modulus 300%, MPa | 13.7 | 12.0 |
| Modulus Ratio | 6.0 | 5.7 |
| G' (10% sw2) | 1.438 | 1.427 |
| G' (1% sw1) | 1.859 | 1.955 |

SSBR/silica formulations are preferred over ESBR/silica formulations in some applications due to their overall better property balance. One drawback of such formulations relative to ESBR formulations, for example, are their generally poorer tear/elongation properties. These properties are of importance in high performance passenger compounds required to pass heavy handling tests. Unexpectedly and surprisingly, the use of a high trans-SBR added to SSBR/BR/silica blend in 5–30 phr at similar compound Tg achieves a tear improvement of about 20% with no drawback in wet properties as indicated by the 0° C. rebound values.

While certain representative embodiments and details have been shown for the purpose of illustrating the subject invention, it will be apparent to those skilled in this art that various changes and modifications can be made therein without departing from the scope of the subject invention.

What is claimed is:

1. A pneumatic tire having a component comprising a vulcanizable rubber composition comprising, based on 100 parts by weight of elastomer (phr),
   (A) from about 5 to about 30 phr of high trans random SBR comprising from about 3 to about 30 percent by weight of styrene and a trans 1,4 butadiene content in the polybutadiene segments of the SBR of greater than 60 percent by weight, wherein said high trans random SBR is produced by a process that comprises copolymerizing styrene and 1,3-butadiene in an organic solvent in the presence of a catalyst system that is comprised of
      (i) an organolithium compound,
      (ii) a group IIa metal salt selected from the group consisting of group IIa metal salts of amino glycols and group IIa metal salts of glycol ethers, and
      (iii) an organometallic compound selected from the group consisting of organoaluminum compounds and organomagnesium compounds; and
   (B) from about 70 to about 95 phr of at least one additional elastomer.

2. The pneumatic tire of claim 1, wherein said vulcanizable rubber composition comprises from about 10 to about 20 phr of high trans random SBR comprising from about 3 to about 30 percent by weight of styrene, and from about 80 to about 90 phr of at least one additional elastomer.

3. The pneumatic tire of claim 1, wherein said high trans random SBR comprises from about 3 to about 20 percent by weight of styrene.

4. The pneumatic tire of claim 1, wherein said high trans random SBR comprises from about 3 to about 10 percent by weight of styrene.

5. The pneumatic tire of claim 1, wherein said high trans random SBR has a trans content of greater than 70 percent by weight.

6. The pneumatic tire of claim 1, wherein said high trans random SBR has a glass transition temperature in a range of from about −65° C. to about −85° C.

7. The pneumatic tire of claim 1, wherein said component is selected from the group consisting of tread cap, tread base, sidewall, apex, chafer, sidewall insert, wirecoat and innerliner.

8. The pneumatic tire of claim 1, wherein said component is a tread cap or tread base.

9. The pneumatic tire of claim 1, wherein said at least one additional elastomer is selected from the group consisting of cis 1,4-polyisoprene rubber (natural or synthetic, although natural is preferred), 3,4-polyisoprene rubber, emulsion and solution polymerization derived styrene/isoprene/butadiene rubber, emulsion and solution polymerization derived styrene/butadiene rubbers, emulsion and solution polymerization derived isoprene/butadiene rubber, emulsion and solution polymerization derived styrene/isoprene rubber, cis 1,4-polybutadiene rubbers and emulsion polymerization prepared butadiene/acrylonitrile copolymers.

10. The pneumatic tire of claim 1, wherein said at least one additional elastomer is solution polymerized styrene/butadiene rubber and cis 1,4-polybutadiene rubber.

11. The pneumatic tire of claim 1, wherein said at least one additional elastomer comprises from about 70 to about 95 phr by weight of solution polymerized styrene/butadiene rubber.

12. The pneumatic tire of claim 1, wherein said at least one additional elastomer has a glass transition temperature in a range of from about −10° C. to about −50° C.

13. The pneumatic tire of claim 1, wherein said vulcanizable rubber composition further comprises from about 40 to about 80 phr of carbon black.

14. The pneumatic tire of claim 1, wherein said vulcanizable rubber composition comprises from about 50 to about 100 phr of silica.

15. The pneumatic tire of claim 1, wherein said vulcanizable rubber composition comprises silica and carbon black in a combined concentration of from about 20 to about 100 phr.

16. The pneumatic tire of claim 1, wherein less than 10 percent of the total quantity of repeat units derived from styrene in said high trans random SBR are in blocks containing more than five styrene repeat units.

17. The pneumatic tire of claim 1, wherein less than 4 percent of the total quantity of repeat units derived from styrene in said high trans random SBR are in blocks containing 5 or more styrene repeat units.

18. The pneumatic tire of claim 1, wherein said high trans random SBR is produced by a process that comprises copolymerizing styrene and 1,3-butadiene in an organic solvent in of a catalyst system that is comprised of (A) an organolithium compound, (B) a group IIa metal salt of an amino glycol, and (C) an organometallic compound selected from the group consisting of organoaluminum compounds containing less than 13 carbon atoms and organomagnesium compounds.

* * * * *